United States Patent
Wang et al.

(10) Patent No.: US 10,142,872 B2
(45) Date of Patent: Nov. 27, 2018

(54) MEASUREMENT METHOD AND DEVICE FOR WIRELESS NETWORK COMMUNICATION SYSTEM

(75) Inventors: Yan Wang, Beijing (CN); Jinbo Zhao, Beijing (CN); Meili Liu, Beijing (CN); Xiaodong Yang, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 53 days.

(21) Appl. No.: 13/382,516

(22) PCT Filed: Jul. 30, 2010

(86) PCT No.: PCT/CN2010/075589
§ 371 (c)(1),
(2), (4) Date: Jan. 5, 2012

(87) PCT Pub. No.: WO2011/012085
PCT Pub. Date: Feb. 3, 2011

(65) Prior Publication Data
US 2012/0120810 A1    May 17, 2012

(30) Foreign Application Priority Data
Jul. 30, 2009    (CN) .......................... 2009 1 0090023

(51) Int. Cl.
*H04W 24/02* (2009.01)
*H04W 24/10* (2009.01)

(52) U.S. Cl.
CPC ............ *H04W 24/10* (2013.01); *H04W 24/02* (2013.01)

(58) Field of Classification Search
CPC ...... H04W 24/10; H04W 24/02; H04W 28/04
(Continued)

(56) References Cited

U.S. PATENT DOCUMENTS 8,134,976 B2 *  3/2012  Wallace ............... H04B 7/0421
                                                  370/230
8,203,978 B2 *  6/2012  Walton ................ H04B 7/0417
                                                  342/368

(Continued)

FOREIGN PATENT DOCUMENTS

CN         101043708 A     9/2001
CN           1479541 A     3/2004
(Continued)

OTHER PUBLICATIONS

International Search report issued in International Application No. PCT/CN2010/075589, dated Nov. 18, 2010.
(Continued)

*Primary Examiner* — Andrew W Chriss
*Assistant Examiner* — Rasha K Fayed
(74) *Attorney, Agent, or Firm* — Ladas & Parry, LLP

(57) ABSTRACT

A measurement method and device for wireless network communication system is disclosed. The method enables operators to use recording information to detect whether there is any problem in network and to perform some necessary optimizing work by enabling user equipment (UE) to automatically record some measurement logs and to periodically report them to the network. Because the information is automatically collected by the UE, the method effectively reduces the workload and cost devotion which is needed for network measurement by manual road measurement. The method enables the operators to obtain measurement information of geography areas that can not be obtained in ordinary road measurement because the UE is randomly distributed at any position in the network.

20 Claims, 7 Drawing Sheets

(58) Field of Classification Search
USPC ....... 370/242, 247, 248, 277, 280, 294, 332, 370/498
See application file for complete search history.

(56) References Cited

U.S. PATENT DOCUMENTS

| | | | | |
|---|---|---|---|---|
| 2003/0117980 | A1* | 6/2003 | Kim | H04W 36/0094 370/332 |
| 2004/0002334 | A1* | 1/2004 | Lee | H04W 36/0083 455/436 |
| 2005/0036474 | A1* | 2/2005 | Zhang | H04B 7/2618 370/347 |
| 2008/0268833 | A1* | 10/2008 | Huang | H04B 7/024 455/425 |
| 2009/0047956 | A1* | 2/2009 | Moe | H04J 11/0093 455/436 |
| 2009/0073902 | A1* | 3/2009 | Astely | H04B 7/2656 370/280 |
| 2010/0041412 | A1 | 2/2010 | Yu | |
| 2010/0172272 | A1* | 7/2010 | Tenny | H04W 24/00 370/280 |
| 2010/0246456 | A1* | 9/2010 | Suo | H04B 7/2656 370/280 |
| 2010/0323711 | A1* | 12/2010 | Damnjanovic | H04B 7/0617 455/450 |

FOREIGN PATENT DOCUMENTS

| | | |
|---|---|---|
| CN | 1509532 A | 6/2004 |
| CN | 101043708 A | 9/2007 |
| CN | 101155376 A | 4/2008 |
| CN | 101299860 A | 11/2008 |
| CN | 101426224 A * | 5/2009 |
| WO | 2008019534 A1 | 2/2008 |

OTHER PUBLICATIONS

Office Action issued in Chinese patent application No. 200910090023.5, dated Apr. 11, 2013 (In Chinese).
Office Action issued in Chinese patent application No. 200910090023.5, dated Apr. 11, 2013 (In English).
Office Action issued in Chinese patent application No. 200910090023.5, dated Aug. 3, 2012 (In Chinese).
European Patent Office, Extended European Search Report, European Patent Application No. 10803918.1, dated Sep. 12, 2016.
QUALCOMM Europe, "Consideration on reporting policy for MDT", 3GPP TSG RAN WG2 meeting #66bis, R2-093709, Jun. 29-Jul. 3, 2009, Los Angeles, USA.
QUALCOMM Europe, "Email discussion summary [66#7] LTE-UMTS: Measurements for minimisation of drive tests", 3GPP TSG RAN WG2 meeting #66 bis, R2-093706, Jun. 29-Jul. 3, 2009, Los Angeles, USA.
European Patent Office, Extended European Search Report, European Patent Application No. 10803918.1, dated Dec. 9, 2016.

* cited by examiner

MEASUREMENT METHOD AND DEVICE FOR WIRELESS NETWORK COMMUNICATION SYSTEM

The application claims the priority of Chinese patent application, which submitted to the Chinese Patent Office on Jul. 30, 2009, the application No. 200910090023.5, invention name as "Measurement method and device for wireless network communication system", with all of its content by reference in this application.

The undermentioned wireless network communication system refers to wireless mobile communication system.

FIELD OF THE PRESENT INVENTION

The present invention relates generally to the field of communication technology, and more particularly to a measurement method and device for wireless network communication system.

BACKGROUND OF THE PRESENT INVENTION

Time Division Duplex (TDD) technology is one of the duplex technology used in mobile communication technology, and corresponds to Frequency Division Duplex (FDD).

In the TDD standard wireless network communication system, the uplink and downlink communication between base station and user equipment use the same frequency channel (ie, carrier) in different time slots, which, by the time difference to separate receive and transmit channels. In certain time period, the base station sends a signal to the user equipment, and in the other time, the user equipment sends a signal to the base station. Between base station and terminal equipment must be concerted to work smoothly.

Corresponding, FDD technology is reception and transmission in the separation of the two symmetrical frequency channel, and use different frequency bands to separate receive and transmit channels, and in some systems, the downlink frequency interval up to 190 MHz.

For TDD technology, as long as the time interval between the upper and lower of base station and mobile station is small, less than the channel coherence time, it can easily estimate channel characteristics according to the signal of peer end.

TDD technology can also be flexible to set up and down conversion time for the realization of asymmetric uplink and downlink bandwidth to realizing significant bottom-line asymmetric internet business. However, this conversion time must be set in tandem with the adjacent base station Compared with the FDD, TDD wireless network communication system can utilize piecemeal frequency band, because up and down link can be divided by time, without requiring the bandwidth symmetrical band.

Moreover, TDD technology does not require transceivers isolator, only needs one switch.

Currently, the in the three 3G (3rd Generation, the third generation mobile communication) technology standard proposed by China, Time Division Synchronous Code Division Multiple Access technology (TD-SCDMA) is the only a standard technique using TDD.

Therefore, in the present wireless network communication systems utilizing TDD technology, including TD-SCDMA and the evolution of the system network, such as High Speed Downlink Packet Access System (HSDPA), High Speed Uplink Packet access system (HSUPA), high-speed packet access system (HSPA +), usually check the network coverage quality and system performance whether is achieved design expectations by means of drive test. Network optimization professional staff drives the vehicles random walk, which equipped with a test terminal, notebook computers and GPS (Global Positioning System, Global Positioning System) receivers and other measuring equipment. The measurement information of various locations recorded by the terminal, which including in particular the occurrence of types of abnormal events measured data, the information including the time and location. Operators found the network problems by these drive test data, such as the inadequately coverage or adjacent cell inappropriately set up, then take the appropriate measures to optimize.

Drive test is mainly carried out manually, which requires a lot of manpower and time, it is great burden to the operator's network construction and maintenance costs. On the other hand, drive test is often conducted outdoors, and it can not be performed indoors as well as some private areas, therefore, in these areas network optimization would be difficult to be performed by drive test.

At present, a Study Item of 3GPP RAN2 is conducted and discussed about minimization of drive test , however, the project includes only the Universal Mobile Telecommunications System utilizing frequency division duplex technology (Universal Mobile Telecommunications System FDD, UMTS FDD), such as broadband CDMA packet data transmission technology (Wideband Code Division Multiple Access, WCDMA) system, and are not related to the UMTS TDD standard systems, such as TD-SCDMA the system. So, how to provide the function to minimize drive test for TDD standard wireless communication network system, is still unavailable.

In the process of implementation of the present invention, the inventors found that there are at least one of the following problems at present:

At present, drive test is mainly carried out manually, which requires a lot of manpower and time, it is great burden to the operator's network construction and maintenance costs. On the other hand, it can only obtain measurement information on outdoor public areas, and can not obtain measurement information indoor and in private areas, such as office or residential buildings, as these areas often have a large number of users, therefore, these location measurement information is more meaningful, but the current technology can not obtain the data, so that operators can not optimize the network in these locations.

SUMMARY OF THE PRESENT INVENTION

The embodiments of the present invention provide a measurement method and device for wireless network communication system, on the one hand, to reduce the great cost devotion in the present manual drive test, and on the other hand, to hope to obtain radio measurement information in the geography areas that can not be reached in ordinary drive test.

To achieve this, on the one hand, the embodiments of the present invention provide a measurement method for wireless network communication system, applying to time division duplex TDD standard systems for wireless communication, the method comprising:

Said TDD standard wireless network communication system user measures the system parameters of said TDD standard wireless network communication system, and record the measurement results of said system parameters according to the pre-configured recording policy;

Said user equipment reports said measurement results of system parameters to TDD standard wireless network communication system base station, according to the pre-configured reporting policy.

On the other hand, the embodiments of the present invention provide a user equipment for wireless network communication system, applying to time division duplex TDD standard systems for wireless network communication, the method comprising:

A communicating module, is used for receiving the system broadcast messages or dedicated radio connection control messages sent by said TDD standard wireless network communication system base station, or the NAS messages forwarded by base station, and reporting measurement results of said system parameters to said TDD standard wireless network communication system base station, according to the pre-configured reporting policy;

A configuration acquiring module, is used for acquiring the information, including whether said user equipment performs measurement in said wireless network communication system, the type of system parameters to be recorded, and/or said pre-configured recording policy and pre-configured reporting policy, according to the system broadcast messages or dedicated radio connection control messages or non-access stratum messages, which received by the communicating module;

A measurement module, is used for measuring said wireless communication system, according to the type of system parameters to be measured acquired by said configuration acquiring module;

A recording module, is used for recording the measurement results of said system parameters measured by said measurement module, according to said pre-configured recording policy acquired by said configuration acquiring module, and sending said measurement results to said base station via said communicating module.

Compared with present technology, the invention including the following advantages:

In the embodiments of present invention, operators can use the measurement information recorded by user equipment (UE), find network problems, as well as the location of the problem, reducing the workload of manual drive test, and reducing the cost of network operation and maintenance. On the other hand, user equipment is randomly distributed in the network, with measurement information collected by a large number of user equipment, network operators can understand the situation in each location, including the areas where traditional manual drive test can not be reached, such as indoor and private areas, so operators can find these regional issues, and implement corresponding optimization, to provide users with a higher quality of service.

DETAILED DESCRIPTION OF THE EMBODIMENTS OF THE PRESENT INVENTION

As described in the background, the present network measurement technology is mainly drive test, and drive test is done by manual, it needs to devote a lot of workload and cost, so brings large burden to operator in network construction and maintenance costs. On the other hand, drive test is often conducted outdoors, and it can not be performed indoors as well as some private areas, therefore, in these areas network optimization would be difficult to be performed by drive test.

For reducing network operation and maintain cost, hope to reduce the great cost devotion in the manual drive test, and on the other hand, hope to obtain radio measurement information in the geography areas that can not be reached in ordinary drive test.

Therefore, the embodiments of the present invention provide a measurement method for wireless network communication system, which enables operators to use recording information to detect whether there is any problem in network and to perform some necessary optimizing work by enabling user equipment (UE) to automatically record some measurement logs and to periodically report them to the network. Because the information is automatically collected by the UE, the method effectively reduces the workload and cost devotion which is needed for network measurement by manual drive test. The method enables the operators to obtain measurement information in the geography areas that can not be obtained in ordinary drive test because the UE is randomly distributed at any position in the network.

Therefore, based on the above technology ideological, the embodiments of the present invention provide a measurement method for wireless network communication system, applying to time division duplex TDD standard systems for wireless network communication, implements network measurement for wireless network communication system by user equipment.

Figure 1:
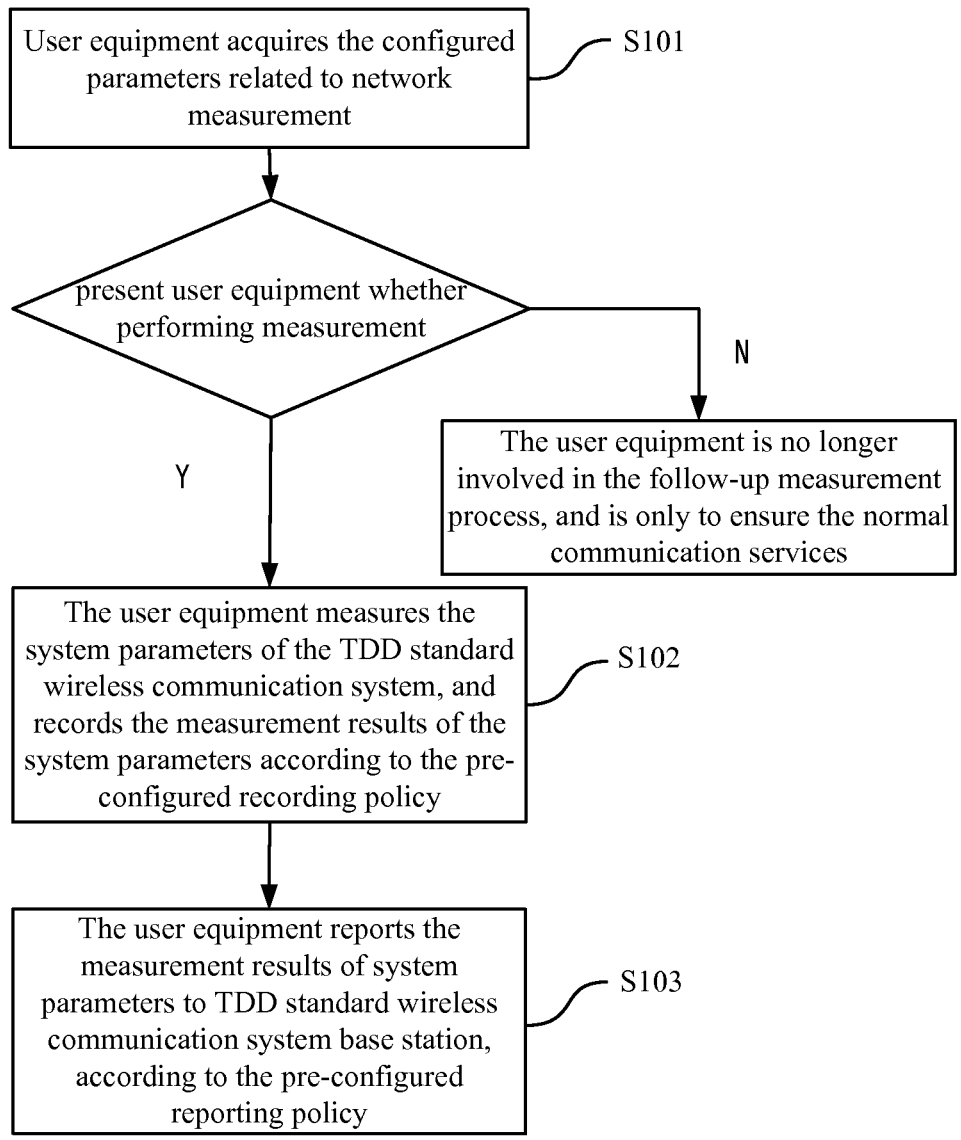
FIG. 1 is a flow diagram of a measurement method for wireless network communication system for the embodiment of the present invention.

As shown in FIG. 1, the embodiment of the present invention provide a measurement method for wireless network communication system, comprising the following steps:

Step 101, User equipment acquires the configured parameters related to network measurement, which are sent by the base station. Therein, the parameters related to network measurement is mainly including:

Whether the user equipment perform measurement;

The type of system parameters to be recorded;

The recording policy for measurement results;

The reporting policy for measurement results.

In the specific application scenarios, the configured parameters are acquired by the user equipment, according to received the system broadcast messages or dedicated radio connection control messages sent by the TDD standard wireless network communication system base station, or the information contained in the non-access stratum (NAS) messages forwarded by base station.

Therein, the information of present user equipment whether performing measurement is a prerequisite to performing the measurement process, and if so, then the present user equipment performs network measurement as following step 102, otherwise, if the information is not, then the present user equipment does not perform network measurement, and the user equipment is no longer involved in the follow-up measurement process, and is only to ensure the normal communication services.

The specific application form of the other measured parameters will be detailed described in subsequent steps, with no more repeat.

It should be noted that, the above configured information in a network measurement job may be sent once, and the user equipment performs measurement in the network measurement job always according to the sent configured parameters, until the network measurement project end. The above configured information in a network measurement project may be sent periodically, so as to update the configured parameters periodically, and the user equipment performs measurement according to the latest configured parameters, such changes do not affect the scope of protection of the invention.

Step 102, The user equipment measures the system parameters of the TDD standard wireless network communication system, and record the measurement results of the system parameters according to the pre-configured recording policy.

Therein, the user equipment performing this step must be the user equipment which needs to perform network measurement in step 101. In the practical application scenarios, according to the different requirement of network measurement project, the type of the equipment includes the following:

Type 1, All TDD standard wireless network communication system user equipment.

The present all TDD standard wireless network communication system user equipments perform network measurement and corresponding feedback, so it can acquire measurement information maximum, and control the status information of each user equipment distributed in the network. But in this condition, it has more larger measurement data feedback and higher amount of available network resources.

Type 2, The TDD standard wireless network communication system user equipment with the specified function.

The purpose of this set is accessing for specific information, for example, choose positioning-enabled user equipment for network measurement, recording the measurement data in the same time recording the location information corresponding to the measurement data, so that the relationship between the measurement data and the location information is more accurate, especially the area needs to be optimized can be accurately positioned.

Moreover, the specified function mentioned here are not limited to the physical features of the above, it also includes the virtual function index compliant with preset standards. Specifically, in step 101, the base station can indicate that only user equipment which meet the specified conditions needs to be involved in network measurement, for example, relationship corresponding to the above specified conditions as IMSI (IMSI: International Mobile Subscriber Identity, international Mobile Subscriber Identity)/IMEI (International Mobile Equipment Identity, international Mobile Equipment Identity code) mod N=k (which, N, k can be determined by network configuration and adjustment), only the user equipment meeting the criteria can participate in network measurement.

It should be noted that, sample function and sample conditions given in the step are based on a technical solution of this invention preferred embodiments, the specific function of which the contents of parameter values and the relationship does not affect the form of changes scope of protection of invention.

Type 3, The TDD standard wireless network communication system user equipment which is at the specified location.

The purpose of this set is measuring specified area, that the user equipment residing or entering the specified area to perform network measurement and corresponding measurement result feedback, in order to determine the network status of the specified area. It can clarify measured object, the user equipment which is not in the specified area do not participate in network measurement, thus saving valuable network resources.

Type 4, The TDD standard wireless network communication system user equipment owned by specified user.

The purpose of this set is selecting the system user equipment in specific area to measure. Because the measurement will increase power consumption of the user equipment or occupation of user equipment resources, affecting the normal usage, not all users are willing to accept this task, therefore, only part of the user's equipments are choosed to perform the measurement.

Above user selection corresponding to the measuring user equipment can be adjusted based on the specific application environment, for example, in the initial period of network plan, operators can specify friendly test user equipment to measure, or in the mature operating stage of the network, can specify the user which signing a service agreement, and the equipment of the these commitment users perform the configured measurement.

In practical scenarios, it also includes other forms of user selection standard and methods, such changes do not affect the scope of protection of the invention On the other hand, after determining the user equipment participate in the network measurement, the user equipment need to be further determine the type of the TDD standard wireless network communication system parameters, and similarly, in step 101, the user equipment acquires appropriate information through messages sent by the base station.

In specific scenarios, for TDD system, the type of above system parameters includes one or more of the following types:

Type 1, The Received Signal Code Power (RSCP) of the TDD standard wireless network communication system Primary Common Control Physical Channel (P-CCPCH);

Type 2, the RSCP of the TDD standard wireless network communication system Secondary Common Control Physical Channel (S-CCPCH);

Type 3, the Interference Signal Code Power (ISCP) of the TDD standard wireless network communication system Time Slot 0 (TS0);

Type 4, the events of user equipment Downlink Pilot Channel (DwPCH) synchronization signal decoding failure;

Type 5, the events of user equipment network handover failure;

Furthermore, in specific scenarios, the equipment not only records the measurement results of system parameters, but also records the following information:

The cell global identifier and the measurement timestamp corresponding to the measurement results of the types of system parameters.

In specific scenarios, the cell global identifier is the global identification of the cell in which the user equipment camps, when the user equipment acquires the corresponding type of measurement results of system parameters. The timestamp corresponds to the time when the user equipment recording the corresponding type of measurement results of system parameters. According to the information, operators can get knowledge of the time and cell where and when the measurement results were recorded, and thus, when the measurement results show that the network quality do not meet the conditions, they can accurately positioning the network cell with problems, and determining the time scope for network quality problem in the network cell, to provide a clear reference information for follow-up of network optimization operation.

Moreover, if the user equipment for network measurement has positioning function, when the user equipment records measurement results, also further records the position corresponding to the measurement results.

This operation can further accurately position the location of the network problems, the measurement of network problems and the accuracy of optimized operation can be further improved.

It should be noted that, the other parameters which achieve the same technical effect of the variety of identification information can also be applied to the technical program, this specific adjustment of parameters, does not affect the scope of protection of the present invention.

Moreover, the pre-configured recording policy includes one or more of the following:

Policy 1, recording according to the pre-configured time period;

Policy 2, recording according to the pre-configured time;

Policy 3, recording when the pre-configured recording triggering condition is satisfied;

Therein, the pre-configured recording triggering condition comprising one or more of the following:

When the RSCP of said TDD standard wireless network communication system P-CCPCH is lower or higher than the pre-configured threshold, the user equipment record the present measured RSCP of P-CCPCH;

When the RSCP of the TDD standard wireless network communication system S-CCPCH is lower or higher than the pre-configured threshold, the user equipment records the present measured RSCP of S-CCPCH;

When the ISCP of the TDD standard wireless network communication system TS0 is lower or higher than the pre-configured threshold, said user equipment recording the present measured ISCP of TS0;

When user equipment decoding DwPCH synchronization signal is failure, said the equipment records the events of DwPCH synchronization signal decoding failure.

When the user equipment occurs handover failure, the user equipment records the events of handover failure;

When the user equipment camps or connects to the specified cells of the TDD standard wireless network communication system, the user equipment records the measurement results of present system parameters.

Step 103, the user equipment reports the measurement results of system parameters to TDD standard wireless network communication system base station, according to the pre-configured reporting policy.

Therein, the pre-configured reporting policy, comprising one or more the following:

Policy 1, reporting according to the pre-configured time period;

For example, report once every few hours, while the initial reporting time can be determined randomly by the user equipment.

It can avoid the network congestion, which a lot of network user equipments send data to the network at the same time.

Policy 2, reporting by selecting a point in time randomly in the pre-configured time scope;

The network can be set a fixed time (such as daily 2:00 AM), or set a time range (such as daily 1:00 AM to 3:00 AM), the user equipment can randomly select for a point in time to report within this range.

Policy 3, reporting when the pre-configured reporting triggering condition is satisfied;

For example, after the user equipment enters into the connected status (RRC_CONNNECTED), report the data recorded before.

Thus, the user equipment completes a network measurement operation process, in practical applications, network measurement is usually carried out in cycles, so if the base station sends a pre-configured parameters, and the user equipment whereby do multiple parameters measurement, returns to step S102 after step S103, to enter a new round of network measurement, such changes do not affect the scope of protection of the invention.

Compared with present technology, the embodiments of present invention including the following advantages:

In the embodiments of present invention, operators can use the measurement information recorded by user equipment (UE), find network problems, as well as the location of the problem, reducing the workload of manual drive test, and reducing the cost of network operation and maintenance. On the other hand, user equipment is randomly distributed in the various regions in the network, recording measurement information by a large number of user equipment, network operators can understand the situation in each location, including the areas which traditional manual drive test can not be reached, such as indoor and private areas, so operators can find these regional issues, and perform corresponding optimization, to provide users with a higher quality of service.

The technical solutions provided by the embodiments of the invention are utilized in the TDD system, including TD-SCDMA or its evolution (eg, HSDPA, HSUPA, HSPA +) system. The base station configures the log information UE need to record, with the recording methods such as periodicity or event-based, and by the reporting methods such as regular reporting or reporting after UE enters into the connected status (RRC_CONNNECTED). The user equipment performs network measurement according to the pre-configured parameters, and records measurement results and reports to the base station.

Here, further integration of specific scenarios, with some typical embodiments of the invention technical solutions. The following network refer to TD-SCDMA network or the evolution (HSDPA, HSUPA, HSPA +) system.

Figure 2:
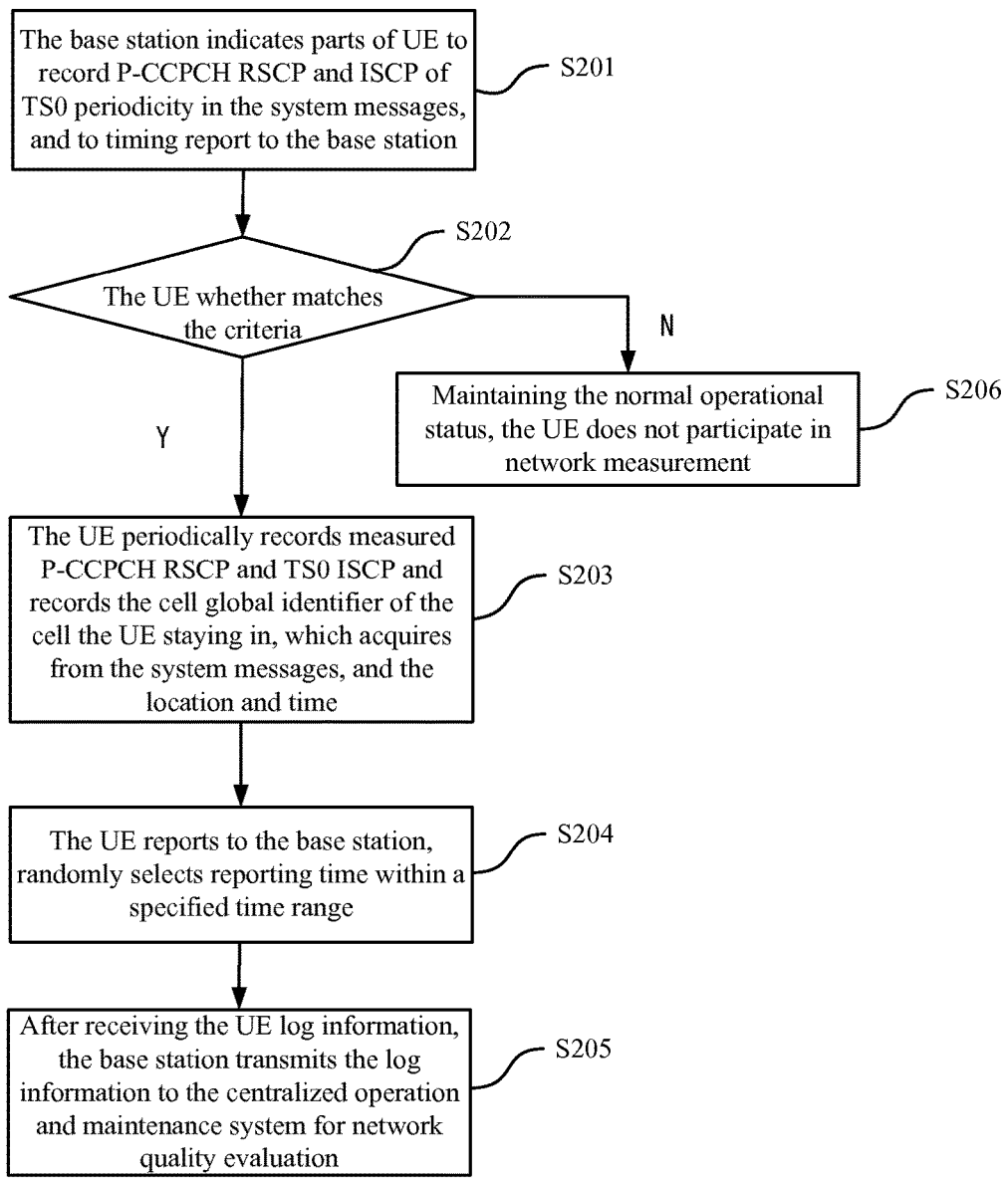
FIG. 2 is a flow diagram of network measurement method for part of user equipment for the embodiments of the present invention.

As shown in FIG. 2, is a flow diagram of network measurement method for some user equipments for the embodiments of the present invention.

Step 201, The base station indicates parts of UE to record P-CCPCH RSCP and ISCP of TS0 periodicity in the system messages, and to timing report to the base station.

The period of recording the P-CCPCH RSCP and the TS0 ISCP is one hour.

Randomly choosing the reporting time to the base station between 1:00 am to 3:00 am by means of timing reporting.

The UE participating in the measurement is determined by the network rules, for example, IMSI/IMEI mod N=k, which, N, k are integers, N>0, 0<=k<=N−1, N and k are configured by the network. The UE only meeting this condition must be recorded.

Step 202, after reading system messages, the UE determines whether it matches the criteria.

If matches, then perform step 203;

If the UE do not matches, then perform step 206.

Step 203, the UE periodically records measured P-CCPCH RSCP and TS0 ISCP according to prescriptive methods, and records the cell global identifier of the cell the UE staying in, which acquires from the system messages, and the location and time.

Step 204, the UE reports to the base station, randomly selects reporting time within a specified time range.

If the UE does not enter into the connected status in the reporting time, then establishes a radio connection first and then transmits the recorded information to the base station.

Step 205, after receiving the UE log information, the base station transmits the log information to the centralized operation and maintenance system for network quality evaluation.

The operators calculate the signal to interference ratio C/I (C/I=RSCP/ISCP*slot 0 of the expansion factor) of the corresponding cell using the collected data. It can understand the interference conditions of the cell, which determine the location in the network which there is strong interference problems, and then use the corresponding optimization.

The evaluation standard is only one of the present invention a preferred embodiment, the specific evaluation standard changes does not affect the scope of protection of the invention.

Step 206, Maintaining the normal operational status, the UE does not participate in network measurement.

Compared with present technology, the invention including the following advantages:

In the embodiments of present invention, operators can use the measurement information recorded by user equipment (UE), find network problems, as well as the location of the problem, reducing the workload of manual drive test, and reducing the cost of network operation and maintenance.

Figure 3:
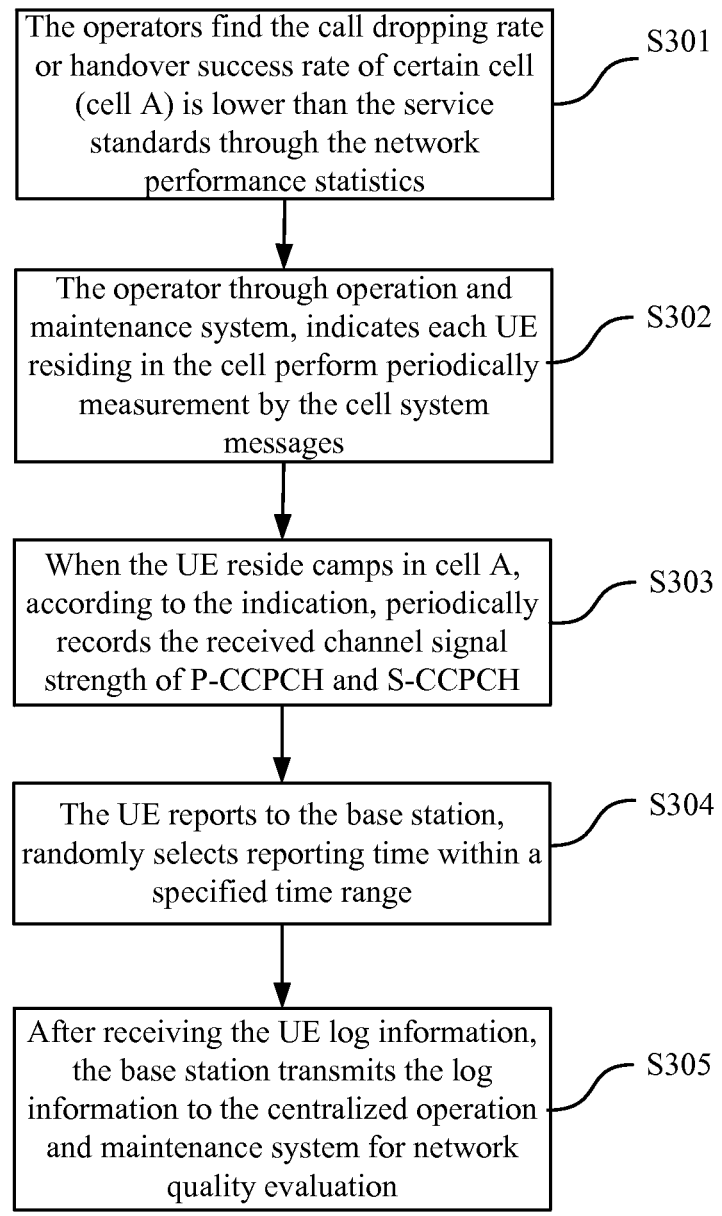
FIG. 3 is a flow diagram of network measurement method for all user equipment in the specified cell for the embodiment of the present invention.

As shown in FIG. 3, is a flow diagram of network measurement method for all user equipments in the specified cell for the embodiment of the present invention.

In the embodiment of present invention, all UE in certain cell record P-CCPCH and S-CCPCH RSCP, and timing report.

Step 301, the operators find the call dropping rate or handover success rate of certain cell (cell A) is lower than the service standards through the network performance statistics.

Step 302, the operator through operation and maintenance system, indicates each UE residing in the cell perform periodically measurement by the cell system messages.

All UEs camping in the cell must periodically record RSCP of P-CCPCH and S-CCPCH, and without recording when leave the cell. Recording period is 30 minutes, with timing reporting method, randomly selects the reporting time between daily 1:00 am to 3:00 am.

Step 303, When the UE camps in cell A, according to the indication, periodically records the received channel signal strength of P-CCPCH and S-CCPCH.

Meanwhile, the UE also records the measurements of generate time, if the UE has a positioning function, then records the location.

If the UE is out of the cell A, no longer records the measurement results. If the UE re-enters the cell A, continues to record measurement results.

Step 304, the UE reports to the base station, randomly selects reporting time within a specified time range.

If the UE is not in the connecting status when the reporting time is coming, the UE first establishes a radio connection, and then transmits the recorded information to the base station, which is related to the cell A.

Step 305, after receiving the UE log information, the base station transmits the log information to the centralized operation and maintenance system for network quality evaluation.

The operators analyze the data, check the location of the cell A, which may exist down the problem of inadequate coverage, and then use the corresponding optimization.

Compared with present technology, the invention including the following advantages:

In the embodiments of present invention, operators can use the measurement information recorded by user equipment (UE), find network problems, as well as the location of the problem, reducing the workload of manual drive test, and reducing the cost of network operation and maintenance, and increasing the efficiency of malfunction treasuring.

Figure 4:
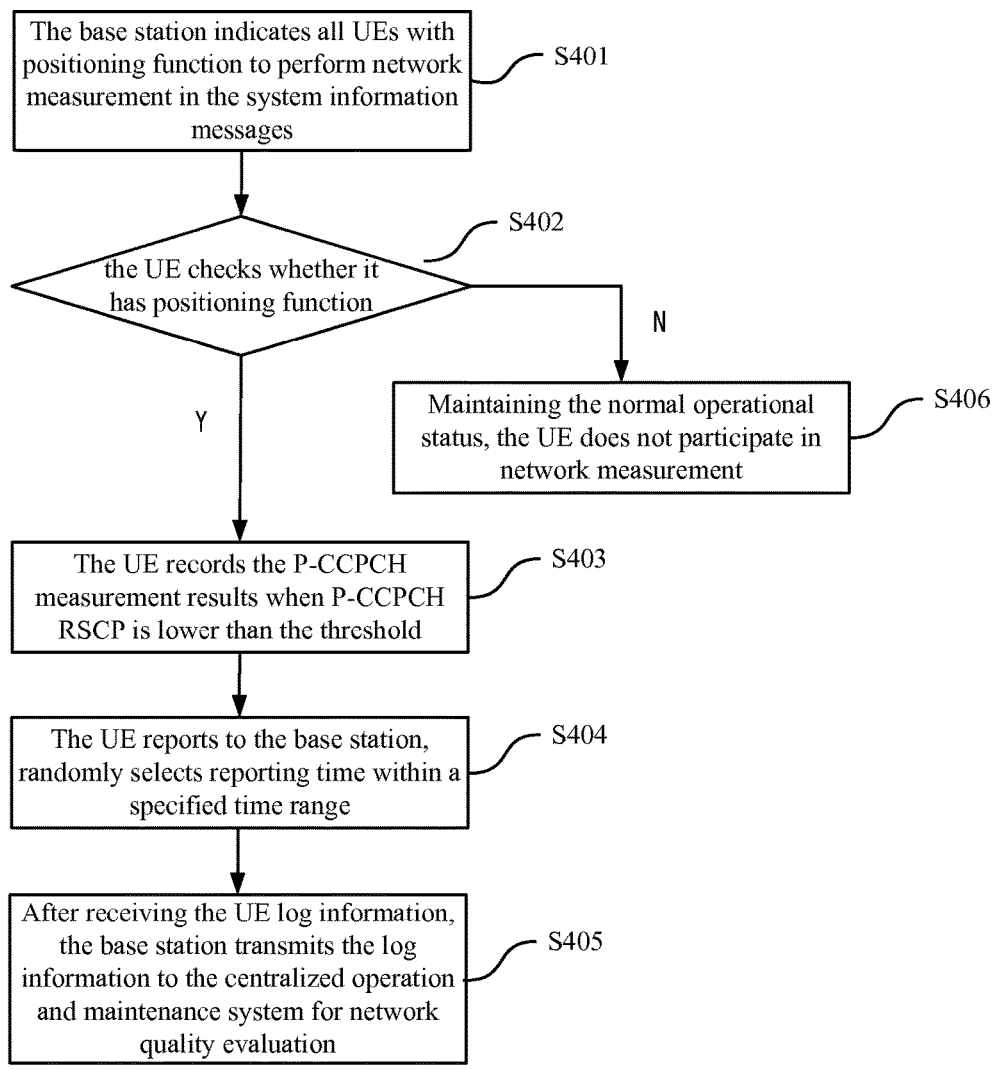
FIG. 4 is a flow diagram of P-CCPCH RSCP measurement for the part of user equipment with specified function in the specified cell for the embodiment of the present invention.

As shown in FIG. 4, is a flow diagram of P-CCPCH RSCP measurement for the part of user equipments with specified function in the specified cell for the embodiment of the present invention.

In the embodiment of present invention, the UE with positioning function record the conditions that P-CCPCH RSCP is lower than the threshold, and timing report to the base station.

Step 401, the base station indicates all UEs with positioning function to perform network measurement in the system information messages.

The measurement and recording policy is recording the measurement results when P-CCPCH RSCP is lower than the pre-configured threshold, and the reporting policy is randomly choosing the reporting time to the base station between 1:00 am to 3:00 am by means of timing reporting.

Step 402, after reading system information messages, the UE checks whether it has positioning function.

If the UE has positioning function, then perform step 403;

If the UE does not have positioning function, then perform step 406.

Step 403, the UE records the P-CCPCH measurement results when P-CCPCH RSCP is lower than the threshold.

When the received channel signal strength of P-CCPCH is lower than the threshold, the UE records the cell global identifier of the cell where the UE is camping, according to the configuration from the system information messages, and records the location and time according to prescriptive methods.

Step 404, the UE reports to the base station, randomly selects reporting time within a specified time range.

If the UE is not in the connected status in the reporting time, then establishes a radio connection first and then transmits the recorded information to the base station.

Step 405, after receiving the UE log information, the base station transmits the log information to the centralized operation and maintenance system for network quality evaluation.

The operators analyze the data, check the network, determine the location of each cell broadcast channel signal is weaker, and adjust whether their coverage is expected to meet the network planning, if not, then use the corresponding optimization.

Step 406, Maintaining the normal operational status, the UE does not participate in network measurement.

Compared with present technology, the invention including the following advantages:

In the embodiments of present invention, operators can use the measurement information recorded by user equipment (UE), find network problems, as well as the location of the problem, reducing the workload of manual drive test, and reducing the cost of network operation and maintenance.

Figure 5:
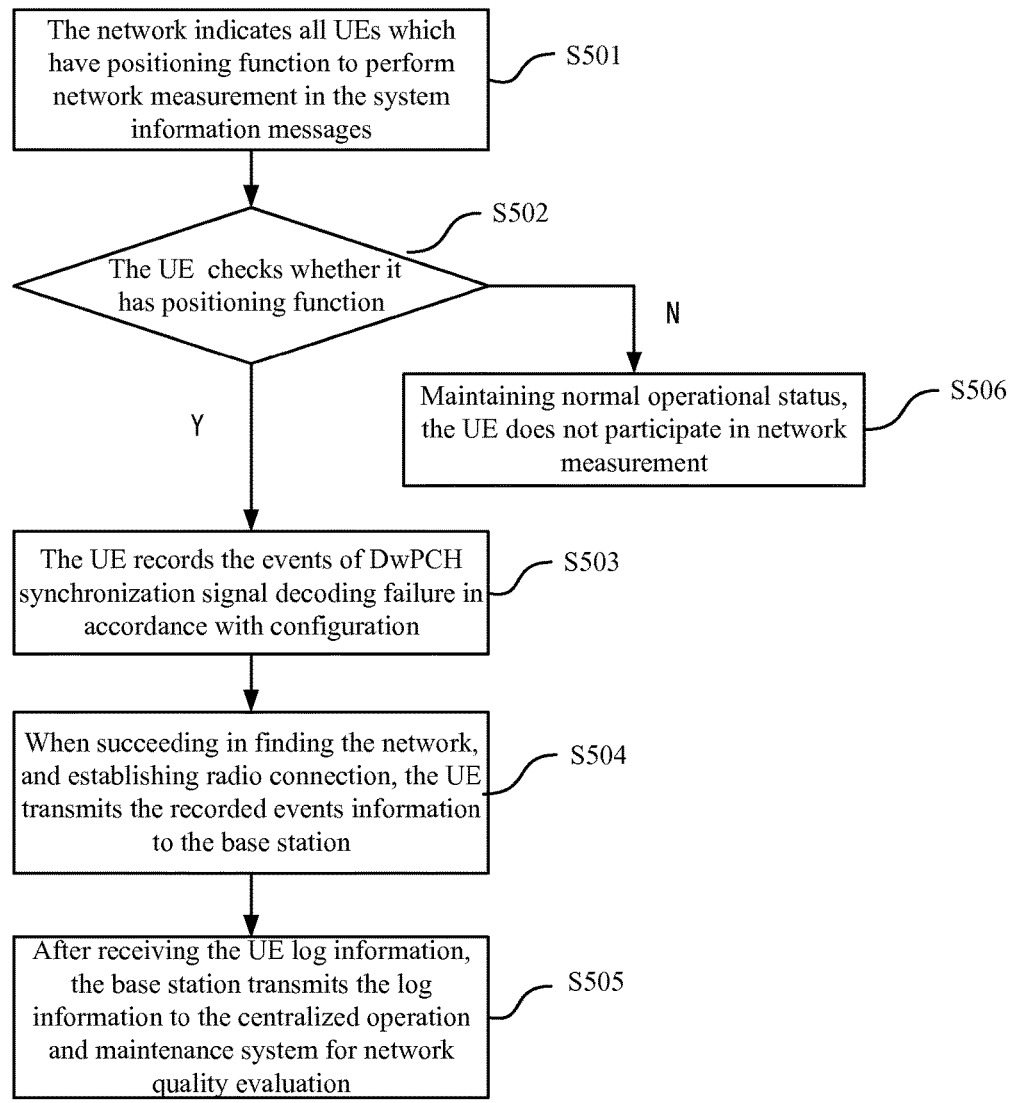
FIG. 5 is a flow diagram of method for the user equipment with specified function recording abnormal events for the embodiment of the present invention.

As shown in FIG. 5, is a flow diagram of method for the user equipment with specified function recording unusual events for the embodiment of the present invention.

Therein, the abnormal events specifically refers to the events of user equipment Downlink Pilot Channel DwPCH synchronization signal decoding failure.

Step 501, the network indicates all UEs which have positioning function to perform network measurement in the system information messages.

The recording method is event-triggered (each failure must be recorded); the reporting method is reporting after UE enters into connected status ((RRC connection is established).

Step 502, after reading system information messages, the UE checks whether it has positioning function.

If the UE has positioning function, then perform step 503;

If the UE does not have positioning function, then perform step 506.

Step 503, the UE records the events of DwPCH synchronization signal decoding failure in accordance with configuration.

When the UE searches the cell in idle mode, if any downlink synchronization code (SYNC_DL) is not detected, then records this event, at the same time records the location and time.

Step 504, when succeeding in finding the network, and establishing radio connection, the UE transmits the recorded events information to the base station.

Step 505, after receiving the UE log information, the base station transmits the log information to the centralized operation and maintenance system for network quality evaluation.

The operators analyze the data, check the location where there are problems, e.g. coverage hole and then make the corresponding optimization.

Step 506, Maintaining normal operational status, the UE does not participate in network measurement.

Compared with present technology, the invention including the following advantages:

In the embodiments of present invention, operators can use the measurement information recorded by user equipment (UE), find network problems, as well as the location of the problem, reducing the workload of manual drive test, and reducing the cost of network operation and maintenance.

Figure 6:
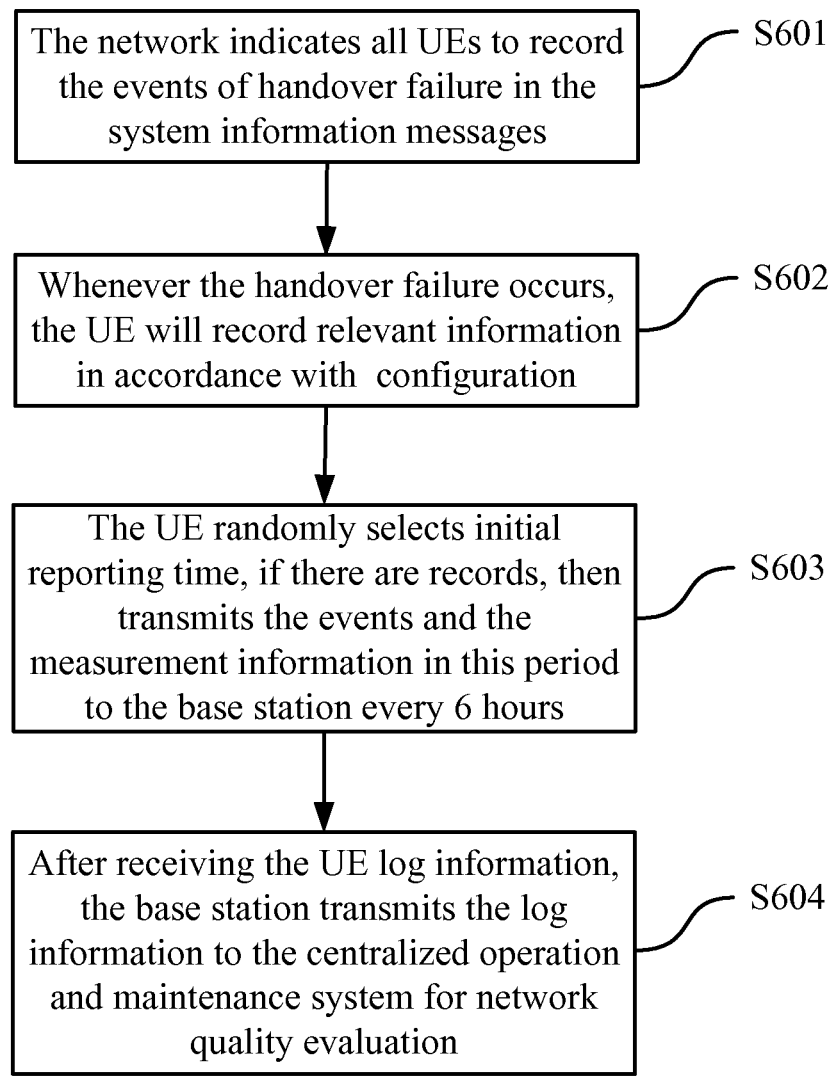
FIG. 6 is a flow diagram of method for all the user equipment recording abnormal events for the embodiment of the present invention.

As shown in FIG. 6, is a flow diagram of method for all the user equipment recording abnormal events for the embodiment of the present invention.

Therein, the abnormal events specifically refer to the events of handover failure.

Step 601, the network indicates all UEs to record the events of handover failure in the system information messages.

The recording method is event-triggered (each failure must be recorded), reporting once every 6 hours by means of periodically reporting.

Step 602, whenever the handover failure occurs, the UE will record relevant information in accordance with configuration.

The UE records the abnormal events and the global identifier of source cell and target cell, and the two cell P-CCPCH RSCP, also records the location (if the UE has a positioning function) and time.

Step 603, the UE randomly selects initial reporting time, if there are records, then transmits the events and the measurement information in this period to the base station every 6 hours.

Step 604, after receiving the UE log information, the base station transmits the log information to the centralized operation and maintenance system for network quality evaluation.

The operators analyze the data, check the cell in the network (or the more specific locations), where there are handover failure problems, and make the corresponding optimization.

Compared with present technology, the invention including the following advantages:

In the embodiments of present invention, operators can use the measurement information recorded by user equipment (UE), find network problems, as well as the location of the problem, reducing the workload of manual drive test, and reducing the cost of network operation and maintenance. On the other hand, user equipment is randomly distributed in the various regions in the network, recording measurement information by a large number of user equipment, network operators can understand the situation in each location, including the areas which traditional manual drive test can not be reached, such as indoor and private areas, so operators can find these regional issues, and perform corresponding optimization, to provide users with a higher quality of service.

The embodiments of the present invention provide a user equipment for wireless network communication system, applying to time division duplex TDD standard systems for wireless network communication.

Figure 7:
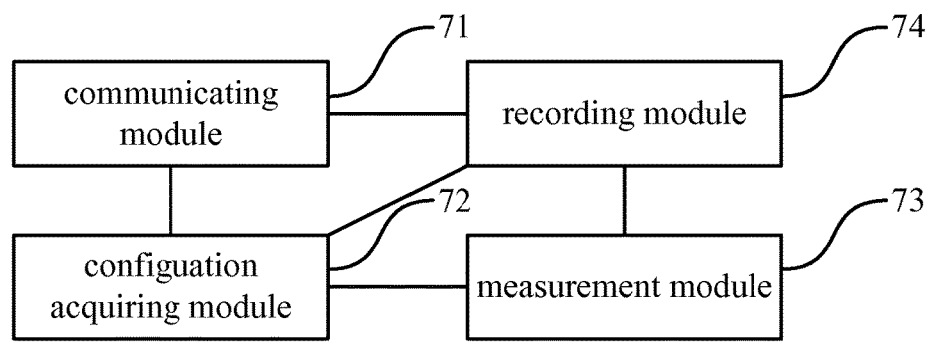
FIG. 7 is a structure diagram of a user equipment for the embodiment for the present invention.

As shown in FIG. 7, a structure diagram of user equipment for the embodiment for the present invention, the user equipment comprising:

A communicating module 71, is used for receiving the system broadcast information messages or dedicated radio connection control messages sent by the TDD standard wireless network communication system base station, or the NAS messages forwarded by base station, and reporting measurement results of the system parameters to the TDD standard wireless network communication system base station, according to the pre-configured reporting policy;

A configuration acquiring module 72, is used for acquiring the information, including whether the user equipment performing measurement in the wireless network communication system, the type of system parameters to be recorded, and/or the pre-configured recording policy and pre-configured reporting policy, according to the system broadcast messages or dedicated radio connection control messages or non-access stratum messages, which received by the communicating module 71;

A measurement module 73, is used for measuring the wireless network communication system, according to the type of system parameters to be measured acquired by the configuration acquiring module 72;

A recording module 74, is used for recording the measurement results of the system parameters measured by the measurement module 73, according to the pre-configured recording policy acquired by the configuration acquiring module 72, and sending the measurement results to the base station via the communicating module 71.

In the specific application scenarios, recording module 74 is further used for recording the cell global identifier and the measurement timestamp, corresponding to the measurement results of the system parameters.

Furthermore, when the user equipment has positioning function, recording module 74 is further used for recording the location corresponding to the measurement results of system parameters.

Therein, the pre-configured recording policy comprising one or more of the following:

Recording according to the pre-configured time period;
Recording according to the pre-configured time;
Recording when the pre-configured recording triggering condition is satisfied;

Said pre-configured reporting policy, comprising one or more of the following:

Reporting according to the pre-configured time period;
Reporting by selecting a point in time randomly in the pre-configured time scope;
Reporting when the pre-configured reporting triggering condition is satisfied;

Compared with present technology, the invention including the following advantages:

In the embodiments of present invention, operators can use the measurement information recorded by user equipment (UE), find network problems, as well as the location of the problem, reducing the workload of manual drive test, and reducing the cost of network operation and maintenance. On the other hand, user equipment is randomly distributed in the network, with measurement information collected by a large number of user equipment, network operators can understand the situation in each location, including the areas where traditional manual drive test can not be reached, such as indoor and private areas, so operators can find these regional issues, and perform corresponding optimization, to provide users with a higher quality of service.

Through the description of the embodiments above, the technical personnel in this field can understand clearly that the present invention can be implemented by hardware or software and necessary present hardware platform. Based on this understanding, the technical program of the present invention can be embodied by a form of software products which can be stored in a nonvolatile storage medium (such as CD-ROM, U disk, mobile hard disk, etc.), including a number of instructions for making a computer device (such as personal computers, servers, or network equipments, etc.) implement the methods described in the embodiments of the present invention.

The technical personnel in this field can be understood that the illustration is only schematic drawings of a preferred embodiment, and the module or process is not necessary for the implementation of the present invention.

The technical personnel in this field can be understood that the modules can be distributed in device of the embodiments according to the description of the embodiments above, and also can be varied in one or multiply device of the embodiments. The modules of the embodiments can be combined into a module, and also can be further split into several sub-modules.

The number of the embodiments is only to describe, it does not represent the pros and cons of the embodiments.

The descriptions above are just preferred implement ways of the present invention. It should be pointed that, for general technical personnel in this field, some improvement and decorating can be done, which should be as the protection scope of the present invention.

The invention claimed is:

1. A measurement method for a wireless network communications system, wherein the method is applied in time division duplex (TDD) standard systems for wireless communication, comprising:

measuring, by a user equipment in the TDD standard systems for wireless communication, Interference Signal Code Power (ISCP) of downlink Time Slot 0 (TS0) of the TDD standard systems for wireless communication, and storing measurement results of the ISCP of TS0 according to a predetermined recording policy; and reporting, by the user equipment, the measurement results of the ISCP of TS0 to a base station in the TDD standard systems for wireless communication, according to a predetermined reporting policy, wherein the predetermined reporting policy includes that the user equipment obtains the previously stored measurement results of the ISCP of TS0 before the user equipment enters into a connected status, wherein the predetermined recording policy comprises storing the measurement results of the ISCP of TS0 when a predetermined storing triggering condition is satisfied, wherein the predetermined storing triggering condition is that when the user equipment experiences handover failure, the user equipment stores events of user equipment handover failure, and when the ISCP of TS0 in the TDD standard systems for wireless communication system parameters is lower or higher than a first predetermined corresponding threshold, the user equipment stores the ISCP of TS0 which has been obtained by a present measurement.

2. The method according to claim 1, wherein the user equipment which stores the measurement results of the system parameters for the TDD standard systems for wireless communication comprises:

all user equipments in the TDD standard systems for wireless communication; or
user equipment(s) with specified function(s) in the TDD standard systems for wireless communication; or
equipment(s) which is(are) at a specified location in the TDD standard systems for wireless communication; or
equipment(s) owned by a specified user in the TDD standard systems for wireless communication.

3. The method according to claim 1, wherein the system parameters of the TDD standard systems for wireless communication further comprise one or more of the following:

Received Signal Code Power (RSCP) of Primary Common Control Physical Channel (P-CCPCH) in the TDD standard systems for wireless communication;
RSCP of Secondary Common Control Physical Channel (S-CCPCH) in the TDD standard systems for wireless communication;
the events of user equipment Downlink Pilot Channel (DwPCH) synchronization signal decoding failure; and
the events of user equipment handover failure.

4. The method according to claim 1, further comprising:
storing, by the user equipment, a cell global identifier and a measurement timestamp corresponding to the measurement results of the system parameters.

5. The method according to claim 1, wherein when the user equipment has positioning function, the method further comprises:
storing, by the user equipment, a location identifier corresponding to the measurement results of the system parameters.

6. The method according to claim 1, wherein the predetermined recording policy further comprises one or more of the following:
storing the measurement results of the system parameters according to a predetermined time period; and
storing the measurement results of the system parameters according to predetermined timings.

7. The method according to claim 1, wherein the predetermined storing triggering condition further comprises one or more of the following:
when RSCP of P-CCPCH in the TDD standard systems for wireless communication is lower or higher than a second predetermined corresponding threshold, the user equipment stores presently measured RSCP of P-CCPCH;
when RSCP of S-CCPCH in the TDD standard systems for wireless communication is lower or higher than a third predetermined corresponding threshold, the user equipment stores presently measured RSCP of S-CCPCH;
when the user equipment fails to decode DwPCH synchronization signal, the user equipment stores events of DwPCH synchronization signal decoding failure; and
when the user equipment camps or connects to specified cells in the TDD standard systems for wireless communication, the user equipment stores measurement results of present system parameters.

8. The method according to claim 1, wherein the predetermined reporting policy, comprises one or more of the following:
reporting the measurement results of the system parameters according to a predetermined time period;
reporting the measurement results of the system parameters by selecting a timing point randomly within a predetermined time duration; and
reporting the measurement results of the system parameters when a predetermined reporting triggering condition is satisfied.

9. The method according to claim 1, wherein, whether the user equipment performs measurement in the TDD standard systems for wireless communication, system parameters to be recorded, a predetermined recording policy and a predetermined reporting policy, are acquired by the user equipment, according to received system broadcast messages or dedicated radio connection control messages sent by the base station in the TDD standard systems for wireless communication or information contained in non-access stratum (NAS) messages which are forwarded by the base station.

10. A user equipment which is applied in time division duplex (TDD) standard systems for wireless communication, comprising:
a processor;
a hardware memory, which is connected with the processor via a bus interface and is configured to store program and data used for the processor;
a transceiver, which is configured to communicate with other devices through transmission media,
when the processor calls and executes the program and data stored in the hardware memory, the user equipment executes the following processing:
measuring Interference Signal Code Power (ISCP) of downlink Time Slot 0 (TS0) of the TDD standard systems for wireless communication, and storing measurement results of the ISCP of TS0 according to a predetermined recording policy; and
reporting the measurement results of the ISCP of TS0 to a base station in the TDD standard systems for wireless communication, according to a predetermined reporting policy, wherein the predetermined reporting policy includes that the user equipment obtains the previously stored measurement results of the ISCP of TS0 before the user equipment enters into a connected status,
wherein the predetermined recording policy comprises storing the measurement results of the ISCP of TS0 when a predetermined storing triggering condition is satisfied, wherein the predetermined storing triggering condition is that when the user equipment experiences handover failure, the user equipment stores events of user equipment handover failure, and when the ISCP of TS0 in the TDD standard systems for wireless communication system parameters is lower or higher than a first predetermined corresponding threshold, the user equipment stores the ISCP of TS0 which has been obtained by a present measurement.

11. The user equipment according to claim 10, wherein the user equipment is configured for:
storing a cell global identifier and a measurement timestamp corresponding to the measurement results of the system parameters.

12. The user equipment according to claim 10, wherein when the user equipment has positioning function, the user equipment is configured for:
storing a location identifier corresponding to the measurement results of the system parameters.

13. The user equipment according to claim 10, wherein the predetermined recording policy further comprises one or more of the following:
storing the measurement results of the system parameters according to a predetermined time period; and
storing the measurement results of the system parameters according to predetermined timings,
wherein the predetermined reporting policy comprises one or more of the following:
reporting the measurement results of the system parameters according to a predetermined time period;
reporting the measurement results of the system parameters by selecting a timing point randomly within a predetermined time duration; and
reporting the measurement results of the system parameters when a predetermined reporting triggering condition is satisfied.

14. The method according to claim 2, wherein, whether the user equipment performs measurement in the TDD standard systems for wireless communication, system parameters to be recorded, a predetermined recording policy and a predetermined reporting policy are acquired by the user equipment, according to received system broadcast messages or dedicated radio connection control messages sent by the base station in the TDD standard systems for wireless communication or information contained in non-access stratum (NAS) messages which are forwarded by the base station.

15. The method according to claim 3, wherein, whether the user equipment performs measurement in the TDD standard systems for wireless communication, system parameters to be recorded, a predetermined recording policy and a predetermined reporting policy are acquired by the user equipment, according to received system broadcast messages or dedicated radio connection control messages sent by the base station in the TDD standard systems for wireless communication or information contained in non-access stratum (NAS) messages which are forwarded by the base station.

16. The method according to claim 4, wherein, whether the user equipment performs measurement in the TDD standard systems for wireless communication, system parameters to be recorded, a predetermined recording policy and a predetermined reporting policy are acquired by the user equipment, according to received system broadcast messages or dedicated radio connection control messages sent by the base station in the TDD standard systems for wireless communication or information contained in non-access stratum (NAS) messages which are forwarded by the base station.

17. The method according to claim 5, wherein, whether the user equipment performs measurement in the TDD standard systems for wireless communication, system parameters to be recorded, a predetermined recording policy and a predetermined reporting policy are acquired by the user equipment, according to received system broadcast messages or dedicated radio connection control messages sent by the base station in the TDD standard systems for wireless communication or information contained in non-access stratum (NAS) messages which are forwarded by the base station.

18. The method according to claim 6, wherein, whether the user equipment performs measurement in the TDD standard systems for wireless communication, system parameters to be recorded, a predetermined recording policy and a predetermined reporting policy are acquired by the user equipment, according to received system broadcast messages or dedicated radio connection control messages sent by the base station in the TDD standard systems for wireless communication or information contained in non-access stratum (NAS) messages which are forwarded by the base station.

19. The method according to claim 7, wherein, whether the user equipment performs measurement in the TDD standard systems for wireless communication, system parameters to be recorded, a predetermined recording policy and a predetermined reporting policy are acquired by the user equipment, according to received system broadcast messages or dedicated radio connection control messages sent by the base station in the TDD standard systems for wireless communication or information contained in non-access stratum (NAS) messages which are forwarded by the base station.

20. The method according to claim 8, wherein, whether the user equipment performs measurement in the TDD standard systems for wireless communication, system parameters to be recorded, a predetermined recording policy and a predetermined reporting policy are acquired by the user equipment, according to received system broadcast messages or dedicated radio connection control messages sent by the base station in the TDD standard systems for wireless communication or information contained in non-access stratum (NAS) messages which are forwarded by the base station.

* * * * *